(12) United States Patent
Brym et al.

(10) Patent No.: US 8,822,589 B2
(45) Date of Patent: Sep. 2, 2014

(54) METHOD FOR THE PRODUCTION OF AQUEOUS FORMULATIONS, AQUEOUS FORMULATIONS, AND THE USE THEREOF

(75) Inventors: Markus Brym, Mannheim (DE); Stephan Hueffer, Ludwigshafen (DE); Audrey Renoncourt, Ludwigshafen (DE); Ulrike Mahn, Mannheim (DE); Franz Glocknitzer, Edenkoben (DE); Alexandra Bruhn, Otterberg (DE)

(73) Assignee: BASF SE, Ludwigshafen (DE)

( * ) Notice: Subject to any disclaimer, the term of this patent is extended or adjusted under 35 U.S.C. 154(b) by 789 days.

(21) Appl. No.: 12/676,242

(22) PCT Filed: Aug. 8, 2008

(86) PCT No.: PCT/EP2008/060254
§ 371 (c)(1),
(2), (4) Date: Mar. 3, 2010

(87) PCT Pub. No.: WO2009/030566
PCT Pub. Date: Mar. 12, 2009

(65) Prior Publication Data
US 2010/0199439 A1    Aug. 12, 2010

(30) Foreign Application Priority Data

Sep. 3, 2007   (EP) .................................... 07115514
Sep. 3, 2007   (EP) .................................... 07115518
Sep. 4, 2007   (EP) .................................... 07115644
Dec. 10, 2007  (EP) .................................... 07122718
Jan. 29, 2008  (EP) .................................... 08101060

(51) Int. Cl.
| *C14C 3/02* | (2006.01) |
| *C08L 39/04* | (2006.01) |
| *C08F 226/06* | (2006.01) |
| *C08F 265/02* | (2006.01) |
| *C08F 220/06* | (2006.01) |
| *C08K 5/092* | (2006.01) |
| *C14C 3/22* | (2006.01) |
| *C08F 222/06* | (2006.01) |

(52) U.S. Cl.
CPC ................ *C14C 3/22* (2013.01); *C08F 220/06* (2013.01); *C08K 5/092* (2013.01); *C08F 222/06* (2013.01); *C08F 226/06* (2013.01)
USPC ......... 524/548; 8/94.1 R; 8/94.19 R; 8/94.33; 8/115.54; 526/258; 526/317.1; 526/318.2; 525/301

(58) Field of Classification Search
USPC ..................... 526/318.2, 318.3, 87; 8/115.54
See application file for complete search history.

(56) References Cited

U.S. PATENT DOCUMENTS

| 4,384,096 A * | 5/1983 | Sonnabend ................... 526/313 |
| 5,186,846 A | 2/1993 | Brueckmann et al. |
| 5,425,784 A * | 6/1995 | Denzinger et al. ............. 8/94.33 |
| 5,714,560 A | 2/1998 | Denzinger et al. |
| 2004/0034182 A1 * | 2/2004 | Raether et al. ................ 526/274 |
| 2006/0153793 A1 | 7/2006 | Chrisstoffels |

FOREIGN PATENT DOCUMENTS

| EP | 0 459 168 | 12/1991 |
| EP | 0 970 148 | 6/2001 |
| EP | 1 335 029 | 8/2003 |
| WO | 03 023069 | 3/2003 |
| WO | 2004 070063 | 8/2004 |
| WO | 2005 005497 | 1/2005 |
| WO | 2005 019480 | 3/2005 |
| WO | 2006 015745 | 2/2006 |

OTHER PUBLICATIONS

U.S. Appl. No. 12/676,263, filed Mar. 3, 2010, Brym, et al.
U.S. Appl. No. 12/676,534, filed Mar. 4, 2010, Brym, et al.

* cited by examiner

*Primary Examiner* — Harold Pyon
*Assistant Examiner* — Katie L Hammer
(74) *Attorney, Agent, or Firm* — Oblon, Spivak, McClelland, Maier & Neustadt, L.L.P.

(57) ABSTRACT

Process for the preparation of aqueous formulations, wherein
(A) at least one ethylenically unsaturated carboxylic acid,
(B) at least one heterocyclic comonomer having at least one permanent cationic charge per molecule and
(C-P1) at least one ethylenically unsaturated dicarboxylic acid or its anhydride are subjected to free radical copolymerization with one another in an aqueous medium and, shortly before the end or after the end of the copolymerization, further ethylenically unsaturated dicarboxylic acid (C-P2) or its anhydride is added.

19 Claims, No Drawings

METHOD FOR THE PRODUCTION OF AQUEOUS FORMULATIONS, AQUEOUS FORMULATIONS, AND THE USE THEREOF

The present invention relates to a process for the preparation of aqueous formulations, wherein
(A) at least one ethylenically unsaturated carboxylic acid,
(B) at least one heterocyclic comonomer having at least one permanent cationic charge per molecule and
(C-P1) at least one ethylenically unsaturated dicarboxylic acid or its anhydride are subjected to free radical copolymerization with one another in an aqueous medium and, shortly before the end or after the end of the copolymerization, further ethylenically unsaturated dicarboxylic acid (C-P2) or its anhydride is added.

The present invention furthermore relates to aqueous formulations comprising at least one copolymer (D) obtainable by copolymerization of
 (A) at least one ethylenically unsaturated carboxylic acid,
 (B) at least one heterocyclic comonomer having at least one permanent cationic charge per molecule and
 (C-P1) at least one ethylenically unsaturated dicarboxylic acid or its anhydride,
(CP-2) at least one ethylenically unsaturated dicarboxylic acid or its anhydride and
(E) if appropriate, at least one polymeric tanning or retanning agent.

The present invention furthermore relates to the use of aqueous formulations according to the invention for the production of leather, and leathers which are produced according to the invention and are suitable in particular for the production of upper leather, articles of apparel and pieces of furniture. The present invention furthermore relates to copolymers (D) and their mixture with at least one ethylenically unsaturated dicarboxylic acid or its anhydride.

In many applications, in particular for the production of upper leather, apparel and pieces of furniture, there is a need for soft leathers, i.e. leathers which have a soft and full feel but nevertheless have sufficient strength. In order to produce sufficiently soft leathers, it is possible not only to choose the finish appropriately but also to influence the softness during the tanning or in particular the retanning itself through the choice of a suitable tanning or retanning agent.

It is known that aqueous formulations of (co)polymers of ethylenically unsaturated carboxylic acids can be used as tanning or retanning agents. Some (co)polymers of ethylenically unsaturated carboxylic acids, however, do not give sufficiently soft leathers.

It was therefore the object to provide a process by means of which it is possible to prepare aqueous formulations which are suitable for the production of particularly soft and full leathers which have good strength and can be readily dyed. It was furthermore the object to provide aqueous formulations which are suitable for the production of particularly soft and full leathers which have good strength and can be readily dyed. Moreover, it was the object to provide particularly soft and full leathers which have good strength and can be readily dyed, and potential uses.

Accordingly, the process defined at the outset was found, also referred to below as preparation process according to the invention.

To carry out the preparation process according to the invention, the following are copolymerized with one another in a preferably aqueous medium:
 (A) at least one ethylenically unsaturated carboxylic acid, preferably at least one ethylenically unsaturated $C_3$-$C_{10}$-carboxylic acid, for example (E)- or (Z)-crotonic acid or in particular methacrylic acid or acrylic acid,
 (B) at least one heterocyclic comonomer having at least one permanent cationic charge per molecule, preferably exactly one permanent cationic charge per molecule, and
 (C-P1) at least one ethylenically unsaturated dicarboxylic acid or its anhydride and, shortly before the end or shortly after the end of the copolymerization, i.e. when the copolymerization reaction as such has already come almost or completely to a stop, further ethylenically unsaturated dicarboxylic acid (C-P2) or its anhydride is added.

Preferably, a weight ratio (C-P1) to (C-P2) in the range from 1:10 to 10:1, preferably from 1:5 to 5:1, particularly preferably from 1:1.5 to 1.5:1, is chosen.

Heterocyclic comonomers having at least one permanent cationic charge per molecule (B), also referred to as comonomer (B) for short in the context of the present invention, are to be understood as meaning those ethylenically unsaturated compounds which, independently of the pH, have at least one cationic charge per molecule. Accordingly, comonomers having exactly one permanent cationic charge per molecule are to be understood as meaning those ethylenically unsaturated compounds which, independently of the pH, have exactly one cationic charge per molecule.

Examples of heterocyclic comonomers (B) are olefins quaternized with $C_1$-$C_4$-alkyl, preferably with primary or secondary $C_1$-$C_4$-alkyl, such as methyl, ethyl, n-propyl, isopropyl, n-butyl, isobutyl or sec-butyl, and having a nitrogen-containing heterocyclic structure.

In general, anions which are inert to free radical reactions, for example carboxylates without ethylenic double bonds, can serve as counterion $A^-$ for neutralizing the positive charge. Acetates, benzoates and propionates will be mentioned by way of example. Furthermore, halide ions, for example bromide and in particular chloride, may be mentioned as a counterion, and moreover tetrafluoroborate, hydrogen sulfate, $C_1$-$C_4$-alkylsulfate, such as, in particular, ethyl sulfate and methyl sulfate, and also sulfate.

Examples of heterocyclic comonomers (B) are comonomers of the general formulae I a to I c

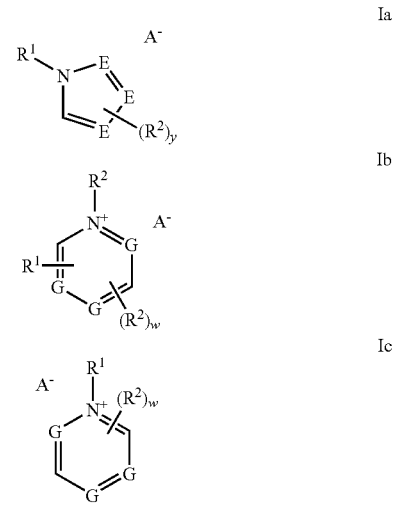

where the variables are chosen as follows:

$R^1$ is selected from $C_2$-ω-$C_{10}$-alkenyl, for example vinyl, ω-allyl($CH_2$=CH—$CH_2$—), referred to as allyl for short in the context of the present invention unless expressly stated otherwise, ω-homoallyl($CH_2$=CH—$CH_2$—$CH_2$—), preferably allyl and particularly preferably vinyl.

$R^2$ is, if possible, different or preferably identical and is preferably selected from primary $C_1$-$C_{10}$-alkyl, for example methyl, ethyl, n-propyl, n-butyl, n-pentyl, n-hexyl, n-heptyl, n-octyl, n-nonyl, n-decyl, preferably from primary $C_1$-$C_4$-alkyl, such as methyl, ethyl, n-propyl, n-butyl and in particular methyl, y is an integer and selected from 1, 2 or 3; y is preferably 1;

w is an integer and selected from zero, 1, 2 or 3; w is preferably 1 and w is particularly preferably zero.

E is selected from nitrogen and C—H, at least one E being a nitrogen and it being preferred if, in formula I a, not more than two neighboring positions in the ring are nitrogen. Thus, olefins of the general formula I a can preferably be:

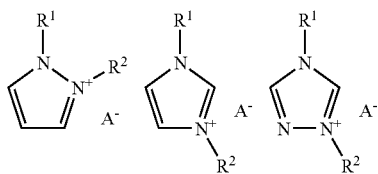

G is selected from N and C—H, with the proviso that, if G is N, the relevant G is not substituted by $R^2$.

$A^-$ is an anion which is inert to free radical reactions, for example carboxylates without ethylenic double bonds. Acetates, benzoates and propionates may be mentioned by way of example. Furthermore, halide ions, for example bromide and in particular chloride, may be mentioned as an anion, and in addition tetrafluoroborate, hydrogen sulfate, $C_1$-$C_4$-alkyl sulfate, such as, in particular, ethyl sulfate and methyl sulfate, and also sulfate.

Particularly preferred heterocyclic comonomers (B) are ortho-, meta- or para-vinyl-n-$C_1$-$C_4$-alkylpyridinium or N-vinyl-3-$C_1$-$C_4$-alkylimidazolium quaternized with $C_1$-$C_4$-alkyl, preferably with primary or secondary $C_1$-$C_4$-alkyl. 3-Methyl-N-vinylimidazolium is very particularly preferred.

A further comonomer is at least one ethylenically unsaturated dicarboxylic acid (C-P1) or its anhydride, preferably at least one ethylenically unsaturated $C_3$-$C_{10}$-dicarboxylic acid or its anhydride, for example maleic acid, maleic anhydride, fumaric acid, itaconic acid, itaconic anhydride, metaconic acid, metaconic anhydride and citraconic acid. Itaconic anhydride and in particular maleic anhydride are preferred.

In one embodiment of the present invention, a mixture of an anhydride of an ethylenically unsaturated dicarboxylic acid (C-P1) and the corresponding ethylenically unsaturated dicarboxylic acid (C-P1), for example a mixture of itaconic anhydride and itaconic acid or preferably a mixture of maleic anhydride and maleic acid, is used. The mixing ratios of anhydride of an ethylenically unsaturated dicarboxylic acid (C-P1) and the corresponding ethylenically unsaturated dicarboxylic acid (C-P1) can be freely chosen. In a special variant of the present invention, an anhydride of an ethylenically unsaturated dicarboxylic acid (C-P1) which is contaminated with from 0.05 to 10% by weight of the corresponding ethylenically unsaturated dicarboxylic acid (C-P1) is used.

In the context of the present invention, in each case the total amount of ethylenically unsaturated dicarboxylic acid (C-P1) and/or its anhydride which is used is considered to be the proportion by weight of (C-P1).

For carrying out the preparation process according to the invention, copolymerization is effected in an aqueous medium, preferably in aqueous solution.

For carrying out the preparation process according to the invention, copolymerization is preferably effected by a free radical method, i.e. with the use of at least one inorganic or organic free radical initiator, such as, for example, a peroxide or hydroperoxide. Di-tert-butyl peroxide, tert-butyl peroctanoate, tert-butyl perpivalate, tert-butyl per-2-ethylhexanoate, tert-butyl permaleate, tert-butyl perisobutyrate, benzoyl peroxide, diacetyl peroxide, succinyl peroxide, p-chlorobenzoyl peroxide and dicyclohexyl peroxodicarbonate may be mentioned by way of example as peroxides or hydroperoxides.

Examples of inorganic free radical initiators are alkali metal peroxodisulfate, in particular sodium peroxodisulfate and potassium peroxodisulfate. The use of redox initiators is also suitable, for example combinations of hydrogen peroxide or sodium peroxodisulfate or one of the abovementioned peroxides with at least one oxidizing or reducing agent, which may also be referred to as catalytic activators. For example the following are suitable as reducing agents: ascorbic acid, tartaric acid, Fe(II) salts, such as, for example, $FeSO_4$, sodium bisulfite and potassium bisulfite. For example, copper(II) salts, such as copper sulfate, are suitable as oxidizing agents.

Other suitable free radical initiators are azo compounds such as 2,2'-azobis(isobutyronitrile), 2,2'-azobis(2-amidinopropane)dihydrochloride (2,2'-azobis(2-methylpropionamidine)dihydrochloride) and 2,2'-azobis(4-methoxy-2,4-dimethylvaleronitrile).

In one embodiment of the present invention, the copolymerization can be carried out at pressures in the range from 1.1 to 10 bar. However, it is preferable to carry out the copolymerization at atmospheric pressure.

In one embodiment of the present invention, the copolymerization is carried out at temperatures in the range from 65 to 120° C., preferably from 80 to 115° C.

In one embodiment of the present invention, the copolymerization is carried out over a period in the range from 30 minutes to 10 hours.

In one embodiment of the present invention, the copolymerization is carried out at a pH in the range from 1 to 10, preferably from 1 to 7.

Some of the comonomers may be strongly acidic; in this case, the pH can be adjusted with the aid of a base.

In one embodiment of the present invention, one or more volatile bases, for example ammonia and preferably amines, such as, for example, ethanolamine, diethanolamine, N-methyldiethanolamine, 1-amino-2-propanol, N,N-dimethylethanolamine, diethylenetriamine, ethylenediamine or tetraethylenepentamine, are used for adjusting the pH.

One or more basic alkali metal salts are preferably used for adjusting the pH. Basic potassium and in particular sodium salts may be mentioned as examples of basic alkali metal salts; potassium hydroxide, sodium hydroxide, sodium carbonate, potassium carbonate, sodium bicarbonate and potassium bicarbonate are preferred.

Some of the comonomers may be strongly acidic. In this case, in another embodiment, a weak acid or a buffer can be added before or during the copolymerization. Suitable weak acids or buffers are hydroxylammonium salts, for example the sulfate or hydrogen sulfate, or phosphorous acid.

Before, during or after the copolymerization, partial or complete neutralization may be effected, for example with one or more basic alkali metal salts, with ammonia or with a basic amine. Examples of basic amines are ethylamine, diethylamine, triethylamine, n-propylamine, di-n-propylamine, N,N-diethanolamine, ethanolamine, N-methylethanolamine, N,N-dimethylethanolamine, N-methyl-N,N-diethanolamine, N-(n-propyl)ethanolamine, N-(n-butyl)ethanolamine and N-(n-butyl)-N,N-diethanolamine. Examples of basic alkali metal compounds are carbonates, bicarbonates and in particular hydroxides of alkali metals, in particular of potassium or sodium. Potassium hydroxide and sodium hydroxide are particularly preferred.

For carrying out the preparation process according to the invention, it is preferable to add further ethylenically unsaturated dicarboxylic acid (C-P2) or its anhydride shortly before the end, for example after at least 90% of the period in which copolymerization is desired, or after the end of the copolymerization. "End of the copolymerization" is to be understood as meaning that no further copolymerization takes place or is detectable, for example no more water is brought to the boil. The copolymerization can be brought to an end by virtue of the fact that all comonomers have reacted. However, the copolymerization can also be brought to an end by reducing the temperature of the reaction mixture. Depending on the decomposition characteristic of the free radical initiator, for example to room temperature, the reaction mixture comprising at least one of the abovementioned comonomers, the copolymer formed up to then and water.

Ethylenically unsaturated dicarboxylic acid (C-P2) or its anhydride can be different from ethylenically unsaturated carboxylic acid (C-P1) or its anhydride, or can preferably be identical thereto.

In one variant of the present invention, an anhydride, for example itaconic anhydride, metaconic anhydride or in particular maleic anhydride is used as the ethylenically unsaturated dicarboxylic acid (C-P1) or its anhydride, and the corresponding ethylenically unsaturated dicarboxylic acid, i.e. itaconic acid or metaconic acid or preferably maleic acid, is used as further ethylenically unsaturated dicarboxylic acid (C-P2) or its anhydride.

When carrying out the preparation process according to the invention, it is observed that further ethylenically unsaturated dicarboxylic acid (C-P2) or its anhydride is not incorporated in the form of polymerized units or is incorporated as such only in a small proportion, in particular not more than 5% by weight, based on added ethylenically unsaturated dicarboxylic acid (C-P2) or its anhydride. Particularly preferably, no measurable proportions of ethylenically unsaturated dicarboxylic acid (C-P2) or its anhydride are incorporated in the form of polymerized units.

In one embodiment of the present invention, the comonomers are used in the following weight ratios:
in the range from 50 to 98% by weight, preferably from 70 to 85% by weight or from 50 to 70% by weight, of ethylenically unsaturated carboxylic acid (A),
in the range from 1 to 30% by weight, preferably from 1.5 to 15% by weight or up to 25% by weight, of comonomer (B),
in the range from 1 to 49% by weight, preferably from 1.5 to 15% by weight, of ethylenically unsaturated dicarboxylic acid (C-P1) or its anhydride.

Data in % by weight are based on total copolymer according to the invention.

In one embodiment of the present invention, one or more further comonomers can be incorporated in the form of polymerized units, for example acrylamide, methacrylamide or one or more $C_1$-$C_{10}$-alkyl esters of (meth)acrylic acid. It is preferable if the proportion of further comonomers does not exceed 50 parts by weight, based on the sum of ethylenically unsaturated carboxylic acid (A), comonomer (B) and ethylenically unsaturated dicarboxylic acid (C-P1) or its anhydride.

In a preferred embodiment of the present invention, no further comonomers are incorporated in the form of polymerized units, in particular none of the comonomers mentioned in the above paragraph.

By carrying out the preparation process according to the invention, an aqueous formulation comprising copolymer (D) and ethylenically unsaturated dicarboxylic acid (C-P2) or its anhydride and, if appropriate, certain proportions of residual monomers selected from ethylenically unsaturated carboxylic acid (A), comonomer (B) and in particular ethylenically unsaturated dicarboxylic acid (C-P1) is obtained.

Aqueous formulation prepared by the preparation process according to the invention may have a solids content in the range from 1 to 80%, preferably from 10 to 50%.

In one embodiment of the present invention, copolymer (D) prepared by the preparation process according to the invention has a K value in the range from 50 to 110, preferably from 20 to 95, particularly preferably from 35 to 95 and more particularly preferably from 60 to 75, determined according to Fikentscher on a 1% by weight aqueous solution at room temperature.

Aqueous formulations prepared by the preparation process according to the invention can be used for the production of leather, preferably for tanning and in particular for retanning.

In one embodiment of the present invention, aqueous formulation prepared by the preparation process according to the invention is mixed with at least one polymeric tanning or retanning agent (E).

Polymeric tanning and retanning agents (E) are known as such. Examples are the homo- and copolymers mentioned in EP 1 335 029 A1 as tanning agents A) to L) and N) and the copolymers mentioned in WO 2004/070063, and in WO 2005/019480 and those mentioned in WO 2006/015745, terpolymers being included.

In one embodiment, polymeric tanning or retanning agent (E) is selected from homo- and copolymers of ethylenically unsaturated carboxylic acids (A), in particular from (meth)acrylic acid. In particular, the homo- and copolymers mentioned in EP 1 335 029 A1 as tanning agents A) to D) and the copolymers mentioned in WO 2005/019480 and those mentioned in WO 2006/015745 are preferred, terpolymers being included.

Very particularly preferred polymeric tanning and retanning agents (E) are homopolymers of (meth)acrylic acid, in particular having a molecular weight $M_n$ in the range from 1000 to 200 000 g/mol.

Very particularly preferred polymeric tanning and retanning agents (E) are homopolymers of (meth)acrylic acid having a K value according to Fikentscher in the range from 10 to 120, preferably from 60 to 100, determined on a 1% by weight aqueous solution neutralized with NaOH (pH 7) at 23° C.

In one embodiment of the present invention, copolymer (D) according to the invention is mixed, for example in aqueous formulation, with polymeric tanning or retanning agent (E) in an amount such that an aqueous formulation is obtained which comprises, based on its total amount, from 5 to 50% by weight, preferably from 15 to 30% by weight, of copolymer (D), a corresponding amount of ethylenically unsaturated dicarboxylic acid (C-P2) or its anhydride and from 1 to 30% by weight, preferably from 5 to 15% by weight, of polymeric tanning or retanning agent (E).

The sequence of addition of aqueous formulation prepared by the preparation process according to the invention and polymeric tanning or retanning agent (E) is arbitrary. Polymeric tanning or retanning agent (E) can be used as a solid or preferably as an aqueous solution or dispersion.

The present invention furthermore relates to aqueous formulations obtainable by mixing aqueous formulations obtainable by the preparation process according to the invention with at least one polymeric tanning or retanning agent (E).

The present invention furthermore relates to aqueous formulations comprising
(D) at least one copolymer obtainable by copolymerization of
 (A) at least one ethylenically unsaturated carboxylic acid,
 (B) at least one heterocyclic comonomer having at least one permanent cationic charge per molecule and
  (C-P1) at least one ethylenically unsaturated dicarboxylic acid or its anhydride,
(E) if appropriate, at least one polymeric tanning or retanning agent and
(CP-2) at least one ethylenically unsaturated dicarboxylic acid or its anhydride.

The aqueous formulations defined above are also referred to as aqueous formulations according to the invention.

Polymeric tanning and retanning agents (E) are known as such. Examples are the homo- and copolymers mentioned in EP 1 335 029 A1 as tanning agents A) to L) and N) and the copolymers mentioned in WO 2004/070063 and in WO 2005/019480 and those mentioned in WO 2006/015745, terpolymers being included.

In one embodiment, polymeric tanning or retanning agent (E) is selected from homo- and copolymers of ethylenically unsaturated carboxylic acids (A), in particular from (meth) acrylic acid. In particular, the homo- and copolymers mentioned in EP 1 335 029 A1 as tanning agents A) to D) and the copolymers mentioned in WO 2005/019480 and those mentioned in WO 2006/015745 are preferred, terpolymers being included.

Very particularly preferred polymeric tanning and retanning agents (E) are homopolymers of (meth)acrylic acid, in particular having a molecular weight $M_n$ in the range from 1000 to 200 000 g/mol.

Very particularly preferred polymeric tanning and retanning agents (E) are homopolymers of (meth)acrylic acid having a K value according to Fikentscher in the range from 10 to 120, preferably from 60 to 100, determined at room temperature on the 1% by weight aqueous solution completely neutralized with NaOH.

Ethylenically unsaturated carboxylic acid (A), comonomer (B), ethylenically unsaturated dicarboxylic acid (C-P1) or its anhydride and ethylenically unsaturated dicarboxylic acid (C-P2) or its anhydride are described above.

Aqueous formulations according to the invention may have a solids content in the range from 1 to 80%, preferably from 10 to 50%.

Aqueous formulations according to the invention may have a pH in the range from 6.5 to 11, preferably from 8 to 10.

The present invention furthermore relates to the use of aqueous formulations according to the invention for the production of leather. The present invention furthermore relates to a process for the production of leather using aqueous formulations according to the invention. The present invention furthermore relates to leather produced using at least one aqueous formulation according to the invention.

In one embodiment of the present invention, the process according to the invention for the production of leather is carried out as a tanning process, also referred to below as tanning process according to the invention, preferably as a retanning process, also referred to below as retanning process according to the invention.

The tanning process according to the invention is generally carried out in such a way that at least one aqueous formulation according to the invention is added in one portion or in a plurality of portions immediately before or during the tanning step. The tanning process according to the invention is preferably carried out at a pH of from 2.5 to 11, preferably up to 4, it frequently being observed that the pH increases by about 0.3 to three units while the tanning process according to the invention is being carried out.

The tanning process according to the invention is generally carried out at temperatures of from 10 to 45° C., preferably at from 20 to 30° C. A duration of from 10 minutes to 12 hours has proven useful, and from one to three hours are preferred. The tanning process according to the invention can be carried out in any desired vessels customary in tanning, for example by drumming in barrels or in rotated drums.

In one embodiment of the present invention, altogether from 0.01 to 10% by weight of aqueous formulation according to the invention, based on the solids content of aqueous formulation according to the invention on the one hand and the shaved weight on the other hand, are used, preferably from 0.5 to 3% by weight.

In one variant of the tanning process according to the invention, aqueous formulation according to the invention is used together with one or more conventional tanning agents, for example with chrome tanning agents, mineral tanning agents, syntans, polymer tanning agents or vegetable tanning agents, as described, for example, in Ullmann's Encyclopedia of Industrial Chemistry, Volume A15, pages 259 to 282 and in particular page 268 ff., 5th Edition, (1990), Verlag Chemie Weinheim. The weight ratio of aqueous formulation according to the invention to conventional tanning agent or the sum of conventional tanning agents is expediently from 0.01:1 to 100:1 (based in each case on the solids contents). In an advantageous variant of the tanning process according to the invention, only a few ppm of conventional tanning agent are added to aqueous formulation according to the invention.

In one variant of the tanning process according to the invention, aqueous formulation according to the invention is used together with one or more fatliquoring agents or oleophilic components.

In one variant of the tanning process according to the invention, aqueous formulation according to the invention is added in one portion or in a plurality of portions before or during the pretanning. Addition to the pickle is also conceivable.

For carrying out the retanning process according to the invention, semifinished products tanned conventionally, i.e. for example with chrome tanning agents, mineral tanning agents, polymer tanning agents, aldehydes, syntans or resin tanning agents, or semifinished products produced according to the invention as described above are used as starting materials. For carrying out the retanning process according to the invention, at least one aqueous formulation according to the invention is allowed to act on semifinished products, i.e. treatment with at least one aqueous formulation according to the invention is effected.

The retanning process according to the invention can be carried out under otherwise customary conditions. Expediently, one or more, i.e. from 2 to 6, treatment steps are chosen and washing with water can be effected between the treatment steps. The temperature at the individual treatment steps is in each case from 5 to 60° C., preferably from 20 to 45° C. Expediently, one or more further compositions usually used during the retanning are employed, for example fatliquors, polymer tanning agents and acrylate- and/or methacrylate-based fatliquoring agents, retanning agents based on vegetable tanning agents, fillers, leather dyes or emulsifiers.

A duration of from 10 minutes to 12 hours has proven useful for the retanning process according to the invention, and from one to three hours are preferred. The retanning process according to the invention can be carried out in any desired vessels customary in tanning, for example by drumming in barrels or in rotated drums.

In one embodiment of the retanning process according to the invention, altogether from 0.01 to 10% by weight of aqueous formulation according to the invention, based on the solids content of aqueous formulation according to the invention on the one hand and on the shaved weight on the other hand, are used, and from 0.5 to 5% by weight are preferred.

The present invention furthermore relates to leather produced by the process according to the invention. Leather according to the invention is distinguished by good fullness, softness and intensity of the dyeing and further good performance characteristics, such as, for example, the embossibility, the tight-grained character and the uniformity of the mill crack in the case of furniture and clothing leather. Leather according to the invention is suitable, for example, for the production of upper leather, articles of apparel, such as, for example, jackets, coats or pants, and furthermore of pieces of furniture.

The present invention furthermore relates to copolymers, also referred to as copolymers (D) in the context of the present invention. Copolymers (D) according to the invention comprise, incorporated in the form of polymerized units,
 (A) at least one ethylenically unsaturated carboxylic acid,
 (B) at least one heterocyclic comonomer having at least one permanent cationic charge per molecule and
 (C-P1) at least one ethylenically unsaturated dicarboxylic acid or its anhydride.

Ethylenically unsaturated carboxylic acids (A), heterocyclic comonomers (B) and comonomer (C-P1) are described above. Processes for the preparation of copolymers (D) according to the invention are likewise described above.

Copolymers (D) according to the invention may be partially or completely neutralized with ammonia, basic amine or basic alkali metal compound, in particular with potassium hydroxide or sodium hydroxide.

In one embodiment of the present invention, copolymers (D) according to the invention comprise, incorporated in the form of polymerized units:
in the range from 50 to 98% by weight, preferably from 70 to 85% by weight, of ethylenically unsaturated carboxylic acid (A),
in the range from 1 to 30% by weight, preferably from 1.5 to 15% by weight, of comonomer (B),
in the range from 1 to 49% by weight, preferably from 1.5 to 15% by weight, of ethylenically unsaturated dicarboxylic acid (C-P1) or its anhydride.

In one embodiment of the present invention, copolymer (D) according to the invention has a K value in the range from 40 to 110, preferably from 50 to 95, determined according to Fikentscher on a 1% by weight aqueous solution at room temperature.

In one embodiment of the present invention, copolymers (D) according to the invention have an average molecular weight $M_w$ in the range from 20 000 to 2 000 000 g/mol, preferably from 50 000 to 1 000 000 g/mol.

The present invention furthermore relates to mixtures of copolymer (D) according to the invention with at least one ethylenically unsaturated dicarboxylic acid (CP-2) or its anhydride.

In one embodiment of the present invention, the weight ratio of (C-P1) to (C-P2) is in the range from 1:10 to 10:1, preferably from 1:5 to 5:1, particularly preferably from 1:1.5 to 1.5:1.

The present invention furthermore relates to mixtures of copolymer (D) according to the invention with at least one polymeric tanning or retanning agent (E). Polymeric tanning and retanning agents (E) are described above.

If it is desired to prepare mixtures according to the invention or copolymer (D) according to the invention in anhydrous form, for example, it is possible to adopt a procedure in which firstly, as described above, an aqueous formulation of copolymer (D) according to the invention is prepared and, if appropriate, ethylenically unsaturated dicarboxylic acid (CP-2) or its anhydride or, if appropriate, polymeric tanning or retanning agent (D) is added and the water is then removed by methods known per se. It is preferable to remove the water by evaporation, in particular by spray drying.

In one embodiment of the present invention, the weight ratio of copolymer (D) according to the invention to polymeric tanning or retanning agent (E) in mixtures according to the invention is in the range from 50:1 to 1:6, preferably from 3:1 to 1:3.

The present invention furthermore relates to aqueous formulations comprising at least one copolymer (D) according to the invention. The present invention furthermore relates to aqueous formulations comprising at least one of the mixtures described above.

Abovementioned aqueous formulations according to the invention may have a solids content in the range from 1 to 80%, preferably from 10 to 50%.

Copolymers according to the invention and mixtures according to the invention are very suitable in particular in the form of aqueous formulations in the production of leather.

The invention is explained by working examples.

I. Preparation According to the Invention of Copolymers (D)

I.1 Preparation of Copolymer (D.1) According to the Invention

The following solutions were prepared:

Solution I.1.1: 237.7 g of acrylic acid (A.1) were dissolved in 279 g of distilled water.

Solution I.1.2: 43.4 g of 3-methyl-N-vinylimidazolium methylsulfate (QVI sulfate) (B.1) were dissolved in 53 g of distilled water.

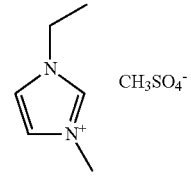

(B.1)

Solution I.1.3: 2.4 g of $Na_2S_2O_8$ were dissolved in 124.7 ml of distilled water.

Solution I.1.4: 24.0 g of maleic acid (C.2-P2) were dissolved in 72.1 ml of distilled water.

225.6 ml of distilled water and 25.1 g of maleic anhydride (C.1-P1) were initially taken in a 2 liter stirred vessel having a plurality of feeds, a reflux condenser and a gas inlet tube. Nitrogen was then allowed to bubble through the initially taken mixture (15 minutes) and heating to 90° C. was effected with stirring.

Thereafter, the additions of solutions I.1.1, I.1.2 and I.1.3 were begun simultaneously. Solutions I.1.1 and I.1.2 were added in the course of 2 hours and solution I.1.3 in the course of 2 hours and 15 minutes, stirring being continued. Stirring was effected for a further 90 minutes at 90° C. and the mixture was then allowed to cool to 60° C. Thereafter, 264.1 g of 50% by weight aqueous sodium hydroxide solution were first added rapidly, heating to 70° C. was then effected and solution I.1.4 was added over the course of 30 minutes. Cooling to room temperature was then effected. A precipitate formed. 50% by weight aqueous sodium hydroxide solution was added until the precipitate had dissolved again.

Aqueous formulation WF.1 according to the invention which had a pH of 8.4 and a solids content of 32.4% and, in addition to maleic acid (as sodium salt), comprised copolymer (D.1) according to the invention was obtained. The K value (according to Fikentscher), measured at room temperature on an aqueous formulation WF.1 diluted to a solids content of 1% by weight, was 91.3 and the average molecular weight $M_w$ was 590 000 g/mol, determined by gel permeation chromatography.

I.2 Preparation of Copolymer (D.2) According to the Invention

The following solutions were prepared:

Solution I.2.1: 237.7 g of acrylic acid (A.1) and 38.40 g of 3-methyl-N-vinylimidazolium methylsulfate (QVI sulfate) (B.1) were dissolved in 326.0 g of distilled water.

Solution I.2.2: 2.4 g of $Na_2S_2O_8$ were dissolved in 124.7 ml of distilled water.

225.6 ml of distilled water and 25.07 g of maleic anhydride (C.1-P1) were initially taken in a 2 liter stirred vessel having a plurality of feeds, a reflux condenser and a gas inlet tube. Nitrogen was then allowed to bubble through the initially taken mixture (15 minutes) and heating to 90° C. was effected with stirring.

Thereafter, the additions of solutions I.2.1 and I.2.2 were begun simultaneously. Solution I.2.1 was added in the course of 2 hours and solution I.2.2 in the course of 2 hours and 15 minutes, stirring being continued. Stirring was effected for a further 90 minutes at 90° C. and the mixture was then cooled to 60° C. Thereafter, 264.1 g of aqueous sodium hydroxide solution (50% by weight) were first added rapidly. Thereafter, heating to 70° C. was effected, 20.29 g of maleic anhydride (C.1-P2) were added as solid and stirring was effected for a further 30 minutes. Thereafter, the mixture was adjusted to a pH of 6.5-7.5 with 134.0 g of aqueous sodium hydroxide solution (25% by weight) and stirring was continued for 60 minutes. Cooling to room temperature was then effected.

Aqueous formulation WF.2 according to the invention, which had a pH of 7.4 and a solids content of 33.3% and, in addition to maleic acid (as sodium salt), comprised copolymer (D.2) according to the invention was obtained. The K value (according to Fikentscher), measured at room temperature on an aqueous formulation WF.2 diluted to a solids content of 1% by weight, was 91.4.

I.3 Preparation of Copolymer (D.3) According to the Invention

The following solutions were prepared:

Solution I.3.1: 276.0 g of acrylic acid (A.1) and 38 g of 3-methyl-N-vinylimidazolium methylsulfate (QVI sulfate) (B.1) were dissolved in 322.0 g of distilled water.

Solution I.3.2: 11.76 g of $Na_2S_2O_8$ were dissolved in 156.2 ml of distilled water.

223.2 ml of distilled water and 24.8 g of maleic anhydride (C.1-P1) were initially taken in a 2 liter stirred vessel having a plurality of feeds and a reflux condenser and gas inlet tube. Thereafter, nitrogen was allowed to bubble through the initially taken mixture (15 minutes) and heating to 90° C. was effected with stirring.

Thereafter, the additions of solutions I.3.1 and I.3.2 were begun simultaneously. Solution I.3.1 was added in the course of 2 hours and solution I.3.2 in the course of 2 hours and 15 minutes, stirring being continued. Stirring was effected for a further 90 minutes at 90° C. and the mixture was then allowed to cool to 60° C. Thereafter, 261.2 g of aqueous sodium hydroxide solution (50% by weight) were first added rapidly. Thereafter, heating to 70° C. was effected, 23.8 g of maleic anhydride (C.1-P2) were added as solid and stirring was effected for a further 30 minutes. Thereafter, the mixture was adjusted to a pH of 6.7 with 61.9 g of aqueous sodium hydroxide solution (50% by weight) and stirred for a further 45 minutes. Cooling to room temperature was then effected.

Aqueous formulation WF.3 according to the invention, which had a pH of 6.7 and a solids content of 32.4% and, in addition to maleic acid (as sodium salt), comprised copolymer (D.3) according to the invention, was obtained. The K value (according to Fikentscher), measured at room temperature on an aqueous formulation WF.3 diluted to a solids content of 1% by weight, was 54.4.

I.4 Preparation of Copolymer (D.4) According to the Invention

The following solutions were prepared:

Solution I.4.1: 253.0 g of acrylic acid (A.1) and 15.8 g of 3-methyl-N-vinylimidazolium methylsulfate (QVI sulfate) (B.1) were dissolved in 316.4 g of distilled water.

Solution I.4.2: 7.05 g of $Na_2S_2O_8$ were dissolved in 134.0 ml of distilled water.

219.49 ml of distilled water and 24.4 g of maleic anhydride (C.1-P1) were initially taken in a 2 liter stirred vessel having a plurality of feeds, a reflux condenser and gas inlet tube. Nitrogen was then allowed to bubble through the initially taken mixture (15 minutes) and heating to 90° C. was effected with stirring.

Thereafter, the additions of solutions I.4.1 and I.4.2 were begun simultaneously. Solution I.4.1 was added in the course of 2 hours and solution I.4.2 in the course of 2 hours and 15 minutes, stirring being continued. Stirring was effected for a further 90 minutes at 90° C. and the mixture was then allowed to cool to 60° C. Thereafter, 281.1 g of aqueous sodium hydroxide solution (50% by weight) were first added rapidly. Thereafter, heating to 70° C. was effected, 23.4 g of maleic acid (C.2-P2) were added as solid and stirring was effected for a further 30 minutes. Thereafter, the mixture was adjusted to a pH of 7.4 with 60.9 g of aqueous sodium hydroxide solution (50% by weight) and stirred for a further 45 minutes. Cooling to room temperature was then effected.

Aqueous formulation WF.4 according to the invention, which had a pH of 7.4 and a solids content of 32.8% and, in addition to the maleic acid (as sodium salt), comprised copolymer (D.4) according to the invention, was obtained. The K value (according to Fikentscher), measured at room temperature on an aqueous formulation WF.4 diluted to a solids content of 1% by weight, was 88.

I.5 Preparation of Copolymer (D.5) According to the Invention

The following solutions were prepared:

Solution I.5.1: 217.6 g of acrylic acid (A.1) and 67.1 g of 3-methyl-N-vinylimidazolium methylsulfate (QVI sulfate) (B.1) were dissolved in 337.4 g of distilled water.

Solution I.5.2: 2.2 g of $Na_2S_2O_8$ were dissolved in 114.2 ml of distilled water.

232.5 ml of distilled water and 25.8 g of maleic anhydride (C.1-P1) were initially taken in a 2 liter stirred vessel having a plurality of feeds, a reflux condenser and a gas inlet tube.

Nitrogen was then allowed to bubble through the initially taken mixture (15 minutes) and heating to 90° C. was effected with stirring.

Thereafter, the additions of solutions I.5.1 and I.5.2 were begun simultaneously. Solution I.5.1 was added in the course of 2 hours and solution I.5.2 in the course of 2 hours and 15 minutes, stirring being continued. Stirring was effected for a further 90 minutes at 90° C. and the mixture was then allowed to cool to 60° C. Thereafter, 241.8 g of aqueous sodium hydroxide solution (50% by weight) was first added rapidly. Thereafter, heating to 70° C. was effected, 24.8 g of maleic acid (C.2-P2) were added as solid and stirring was effected for a further 30 minutes. Thereafter, the mixture was adjusted to a pH of 7.6 with 60.9 g of aqueous sodium hydroxide solution (50% by weight) and stirred for a further 45 minutes. Cooling to room temperature was then effected.

Aqueous formulation WF.5 according to the invention, which had a pH of 7.5 and a solids content of 31.8% and, in addition to maleic acid (as sodium salt), comprised copolymer (D.5) according to the invention, was obtained. The K value (according to Fikentscher), measured at room temperature on an aqueous formulation WF.5 diluted to a solids content of 1% by weight, was 94.

I.6 Preparation of Copolymer (D.6) According to the Invention

The following solutions were prepared:

Solution I.6.1: 235.1 g of acrylic acid (A.1) and 38.0 g of 3-methyl-N-vinylimidazolium methylsulfate (QVI-sulfate) (B.1) were dissolved in 315.6 g of distilled water.

Solution I.6.2: 11.8 g of $Na_2S_2O_8$ were dissolved in 156.2 ml of distilled water.

223.2 ml of distilled water, 24.8 g of maleic anhydride (C.1-P1) and 4.7 g of phosphorous acid were initially taken in a 2-liter stirred vessel having a plurality of feeds, reflux condenser and a gas inlet tube. Nitrogen was then allowed to bubble through the initially taken mixture (15 minutes) and heating to 90° C. was effected with stirring.

Thereafter, the additions of solutions I.6.1 and I.6.2 were begun simultaneously. Solution I.6.1 was added in the course of 3 hours and solution I.6.2 in the course of 3 hours and 15 minutes, stirring being continued. Stirring was effected for a further 90 minutes at 90° C. and the mixture was then allowed to cool to 60° C. Thereafter, 261.3 g of aqueous sodium hydroxide solution (50% by weight) was first added rapidly. Thereafter, heating to 70° C. was effected, 20.1 g of maleic anhydride (C.1-P2) were added as solid and stirring was effected for a further 30 minutes. Thereafter, a pH of 6.2-7.2 was established with 123.8 g of aqueous sodium hydroxide solution (25% by weight) and stirring was effected for a further 60 minutes. Cooling to room temperature was then effected.

Aqueous formulation WF.6 according to the invention, which had a pH of 6.6 and a solids content of 33.2% and, in addition to maleic acid (as sodium salt), comprised copolymer (D.6) according to the invention, was obtained. The K value (according to Fikentscher), measured at room temperature on an aqueous formulation WF.6 diluted to a solids content of 1% by weight, was 51.9.

TABLE 1

Properties of the copolymers (D.1) to (D.5) according to the invention and of the aqueous formulations (WF.1) to (WF.5) according to the invention

|   |   | (A.1) [% by wt.] | (B.1) [% by wt.] | (C-P1) [% by wt.] | (C-P2) [% by wt.] | K value | Solids content | pH |
|---|---|---|---|---|---|---|---|---|
| (D.1) | WF.1 | 77.9 | 14.2 | 7.9 | 8.2 | 91.3 | 32.4 | 8.4 |
| (D.2) | WF.2 | 78.9 | 12.8 | 8.3 | 6.7 | 91.4 | 33.3 | 7.4 |
| (D.3) | WF.3 | 81.5 | 11.2 | 7.3 | 7.0 | 54.4 | 32.4 | 6.7 |
| (D.4) | WF.4 | 86.3 | 5.4 | 8.3 | 8.0 | 88 | 32.8 | 7.4 |
| (D.5) | WF.5 | 70.1 | 21.6 | 8.3 | 8.0 | 94 | 31.8 | 7.5 |
| (D.6) | WF.6 | 69.7 | 23.0 | 7.3 | 6.7 | 51.9 | 33.2 | 6.6 |

Data in % by weight of (A.1), (B.1) and (C-P1) are based on total copolymer (D.1) according to the invention and add up to 100% by weight. Data in % by weight of (C-P2) not incorporated in the form of polymerized units are based on total copolymer (D) according to the invention.

II. Retanning Experiments with Copolymers According to the Invention and Comparative Copolymer V-CP.7
Production of Upper Leather (General Method)

Data in % are always % by weight and are based on the shaved weight, unless expressly stated otherwise. In the case of aqueous formulations, the data in % always relate to the proportion of solid or of active substance, unless expressly stated otherwise.

Two commercial Cattle Wetblue (from Packer, USA) were shaved to a thickness of from 1.7 to 1.9 mm. The core region was cut in each case into six strips of about 700 g each. 1.5% by weight of sodium formate and 0.5% of sodium bicarbonate and 1% of a naphthalenesulfonic acid/formaldehyde condensate, prepared according to U.S. Pat. No. 5,186,846, example "Dispersant 1", were then added to the strips in a drum (50 l) and with a liquor length of 200% (based on shaved weight) at intervals of 10 minutes. After 70 minutes, the liquor was discharged. The strips were then distributed over separate drums 1 to 6 for drumming.

In each case 2% of a 40% strength aqueous solution of polyacrylic acid ($M_n$ 70 000 g/mol, pH 5.5) (E.1) were added, together with 100% of water, to the drums 1 to 7 for drumming at from 25 to 35° C. After a drumming time of 20 minutes, in each case 2% of sulfone tanning agent from EP-B 0 459 168, example K1, 4% of vegetable tanning agent Mimosa and 5% of the aqueous formulation WF according to the invention according to table 1 or comparative formulation were metered in succession. After 60 minutes, in each case 2% by weight of a 50% by weight (solids content) aqueous solution of dyes whose solids had the following composition, were metered in:

70 parts by weight of dye from EP-B 0 970 148, example 2.18, 30 parts by weight of Acid Brown 75 (iron complex), Color Index 1.7.16

Drumming was then effected for a further 30 minutes in the drum.

Thereafter, acidification was effected in a plurality of steps of 0.3 to 0.5% with formic acid to a pH of from 3.8 to 4.2. After 20 minutes, the liquor was evaluated with regard to the exhaustion and was discharged. The leathers were washed with 200% of water.

Thereafter, 4% of a fatliquor according to WO 03/023069, example A, and, after 60 minutes at 15 revolutions per minute, 1% of the abovementioned dye mixture were metered into 100% of water (50° C.). After 20 minutes, acidification to pH 3.8 was effected with 1% formic acid.

The leathers thus obtainable were washed, dried, staked and rated according to the test criteria set out in table 2. The leathers L.1 to L.6 according to the invention and the comparative leather V-L.7 were obtained. The rating was effected according to a rating system from 1 (very good) to 5 (poor).

Comparative copolymer V-CP.7 was a random acrylic acid/acrylamide copolymer having a K value according to Fikentscher of 70 (1% by weight solution in water), comonomer ratio in mol %: (acrylic acid:acrylamide) 90:10.

TABLE 2

Upper leathers according to the invention and their properties

| Leather | Copolymer | Fullness | Softness | Grain tightness | Fineness of the grain texture | Completeness of dyeing (section) | Levelness |
|---------|-----------|----------|----------|-----------------|-------------------------------|----------------------------------|-----------|
| L.1 | (D.1) | 1 | 2 | 2 | 2 | 1 | 2 |
| L.2 | (D.2) | 1.5 | 2.5 | 1.5 | 2.5 | 1.5 | 2.5 |
| L.3 | (D.3) | 2 | 2 | 1 | 1.5 | 1.5 | 2 |
| L.4 | (D.4) | 1.5 | 2 | 2 | 2 | 2.5 | 1.5 |
| L.5 | (D.5) | 1 | 2.5 | 1 | 1 | 2 | 2 |
| L.6 | (D.6) | 1 | 2 | 2 | 2.5 | 2 | 2 |
| V-L.7 | V-CP.7 | 2.5 | 3 | 2.5 | 3 | 2.5 | 2.5 |

The leathers according to the invention had in particular outstanding fullness and softness in combination with an excellent tight-grained character. Also advantageous is the finding that here not only are the tanning assistants and dyes more uniformly distributed in the leather but also that a particularly close, fine grain is observed, which in particular is an assessment criterion for high-quality upper leather.

The invention claimed is:

1. A process for the preparation of an aqueous formulation, comprising:
    (1) free radically copolymerizing:
        (A) at least one ethylenically unsaturated carboxylic acid,
        (B) at least one heterocyclic comonomer having at least one permanent cationic charge per molecule, and
        (C-P1) at least one ethylenically unsaturated dicarboxylic acid or an anhydride thereof, to produce a copolymer, and
    adding an ethylenically unsaturated dicarboxylic acid (C-P2) or an anhydride thereof after at least 90% of the period in which the copolymerization is desired or after the end of the copolymerization,
    wherein not more than 5% by weigh of the ethylenically unsaturated dicarboxylic acid (C-P2) or an anhydride thereof, based on the total weight of the ethylenically unsaturated dicarboxylic acid (C-P2) or an anhydride thereof, is incorporated into the copolymer in the form of polymerized units.

2. The process according to claim 1, wherein no measurable amount of the ethylenically unsaturated dicarboxylic acid (C-P2) or an anhydride thereof is copolymerized with (A), (B), and (C-P1).

3. The process according to claim 1, wherein the copolymerization is conducted at a pH in the range from 1 to 7.

4. The process according to claim 1, wherein the copolymerization is conducted at a temperature in the range from 65 to 120° C.

5. The process according to claim 1, wherein the comonomers are used in the following weight ratios:
    from 50 to 98% by weight of the ethylenically unsaturated carboxylic acid (A),
    from 1 to 30% by weight of the heterocyclic comonomer having at least one permanent cationic charge per molecule (B), and
    from 1 to 49% by weight of the ethylenically unsaturated dicarboxylic acid (C-P1) or an anhydride thereof.

6. The process according to claim 1, wherein the ethylenically unsaturated carboxylic acid (A) is selected from acrylic acid or methacrylic acid.

7. The process according to claim 1, wherein the comonomer with at least one permanent cationic charge per molecule (B) is selected from salts of N-vinyl-3-methylimidazolium.

8. The process according to claim 1, further comprising mixing the copolymer with at least one polymeric tanning or retanning agent (E).

9. The process according to claim 8, wherein the polymeric tanning or retanning agent (E) is selected from homo- and copolymers of ethylenically unsaturated carboxylic acids (A).

10. The process according to claim 1, wherein the weight ratio of (C-P1) to (CP-2) is from 1:5 to 5:1.

11. The process according to claim 1, wherein the weight ratio of (C-P1) to (CP-2) is from 1:10 to 10:1.

12. The process according to claim 1, wherein the weight ratio of (C-P1) to (CP-2) is from 1:1.5 to 1.5:1.

13. The process according to claim 1, wherein the ethylenically unsaturated dicarboxylic acid (C-P2) or an anhydride thereof is added is shortly before the end of the copolymerization.

14. The process according to claim 1, wherein the ethylenically unsaturated dicarboxylic acid (C-P2) or an anhydride thereof is added after the end of the copolymerization.

15. An aqueous formulation, comprising:
    at least one copolymer (D) obtained by copolymerization of (A), (B) and (C-P1):
    (A) at least one ethylenically unsaturated carboxylic acid,
    (B) at least one heterocyclic comonomer having at least one permanent cationic charge per molecule, and
    (C-P1) at least one ethylenically unsaturated dicarboxylic acid or an anhydride thereof,
    wherein the formulation also comprises:
    (C-P2) at least one ethylenically unsaturated dicarboxylic acid or an anhydride thereof, and
    (E) at least one polymeric tanning or retanning agent.

16. The aqueous formulation according to claim 15, wherein polymeric tanning or retanning agent (E) is selected from homo- and copolymers of ethylenically unsaturated carboxylic acids (A).

17. A process for the production of leather comprising treating animal skins or hides with the aqueous formulation of claim 15.

18. A leather produced by the process of claim 17.
19. A method of producing leather, comprising contacting the composition of claim 15 with a cow hide.

\* \* \* \* \*

UNITED STATES PATENT AND TRADEMARK OFFICE
CERTIFICATE OF CORRECTION

PATENT NO. : 8,822,589 B2  
APPLICATION NO. : 12/676242  
DATED : September 2, 2014  
INVENTOR(S) : Markus Brym et al.

Page 1 of 1

It is certified that error appears in the above-identified patent and that said Letters Patent is hereby corrected as shown below:

On the title page, Item (22), the PCT Filing Date is incorrect. Item (22) should read:

--(22) PCT Filed: Aug. 5, 2008--

Signed and Sealed this  
Thirtieth Day of December, 2014

Michelle K. Lee  
*Deputy Director of the United States Patent and Trademark Office*